United States Patent Office 3,000,907
Patented Sept. 19, 1961

3,000,907
CHLORINATED 4,5,6,7,10,10-HEXACHLORO-4,7-ENDOMETHYLENE - 4,7,8,9 - TETRAHYDRO-PHTHALANE INSECTICIDES
Hans Feichtinger, Duisburg-Beeck, Hans Tummes, Duisburg-Meiderich, and Siegfried Puschhof, Duisburg-Beeck, Germany, assignors to Ruhrchemie Aktiengesellschaft, Oberhausen-Holten, Germany, a German corporation
No Drawing. Filed May 27, 1955, Ser. No. 511,776
Claims priority, application Germany June 2, 1954
14 Claims. (Cl. 260—346.2)

This invention relates to and has as its object the production of novel chlorinated 4.5.6.7.10.10-hexachloro-4.7-endomethylene-4.7.8.9-tetrahydrophthalane, which have been found to constitute extremely effective insecticides.

The 4.5.6.7.10.10 - hexachloro - 4.7-endomethylene-4.7.8.9-tetrahydrophthalane has the formula:

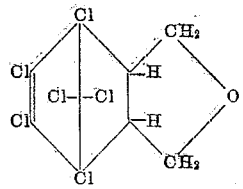

The insecticides, in accordance with the invention, which are obtained by chlorinating the above product, may contain 6.5 to 10 chlorine atoms per molecule and preferably contains 8 chlorine atoms per molecule, i.e., it is 1.3.4.5.6.7.10.10-octachloro-4.7-endomethylene-4.7.8.9-tetrahydrophthalane. These insecticides, due to their expectionally high activity and wide effective range, are extremely valuable for combatting undesirable insect life. The novel chlorination products in accordance with the invention, are practically insoluble in water, are extremely stable and resistant in air toward moisture, and toward acid and alkaline materials, and may be used alone or in any desired conventional admixture as an insecticide. For example, the novel chlorination products may be admixed with other insecticides and/or non-insecticidally active diluents.

The 4.5.6.7.10.10 - hexachloro - 4.7-endomethylene-4.7.8.9-tetrahydrophthalane used as the starting material for the insecticides according to the invention can be produced by various methods.

Hexachlorocyclopentadiene can be converted with cis-2-butene-1.4-diol in the presence of solvents at elevated temperature into 1.4.5.6.7.7-hexachloro-2.3-dimethylol-bicyclo-(2.2.1)-5-heptene according to the following equation:

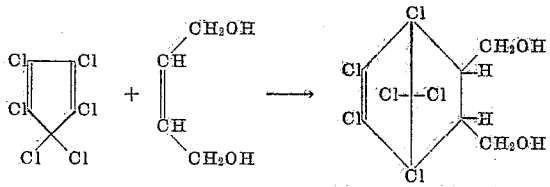

By dehydration this addition product undergoes cyclization to form 4.5.6.7.10.10-hexachloro-4.7-endomethylene-4.7.8.9-tetrahydrophthalane according to the following equation:

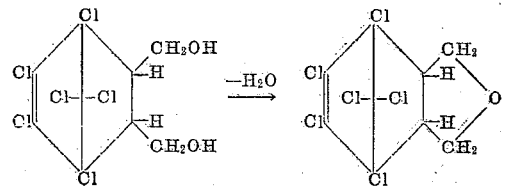

Both of the conversions may also be effected simultaneously, but with a poorer yield, by heating hexachlorocyclo-pentadiene and cis-2-butene-1.4-diol in the heterogeneous phase in the absence of a solvent.

The conversion of hexachlorocyclopentadiene with cis-2-butene-1.4-diol is best effected in solvents in which the two starting components are soluble in order that the reaction may proceed in the homogeneous phase. Examples of particularly well suited solvents are dioxane, tetrahydrofurane, and alcohols having more than two carbon atoms. The quantitative proportion of hexachlorocyclopentadiene to cis-2-butene-1.4-diol may be selected within wide limits. However, a stoichiometrical quantitative proportion should generally be used. The quantity of the solvent is dependent upon the quantity required to convert both of the non-miscible reactants, at the reaction temperature used, into a homogeneous phase. The reaction temperature may range between 100 and 150° C.

The reaction time is determined by the temperature and the quantity of the solvent. The higher the reaction temperature and the smaller the quantity of solvent, the more rapidly the conversion proceeds. At a temperature of 120° C. and with the use of dioxane as the solvent, the reaction time, with an optimum conversion, amounts to 2-3 days. When using solvents boiling below the reaction temperature, the conversion has to be effected in pressure vessels. The separation of the 1.4.5.6.7.7-hexachloro - 2.3 - dimethylol - bicyclo(2.2.1)-5-heptene is effected by distilling off the solvent and the unconverted starting products under a reduced pressure. In this distillation, the addition product is obtained as the residue consisting of a colorless to faintly dark colored crystal mass. It may, either immediately or after recrystallization, be subjected to subsequent dehydration. Chloroform is particularly suitable as solvent for the reaction product.

The dehydration is expediently effected in an organic solvent by means of catalytic quantities of strong non-volatile acids. Suitable dehydrating agents are sulfuric acid, phosphoric acid, pyrophosphoric acid, toluene sulfonic acid, and others. The quantity of the dehydrating agent may range between 0.1 to 5% by weight of the quantity charged of the addition product. The solvents used may be such non-reactive organic compounds which azeotropically remove the water formed from the reaction product. Particularly well suited are toluene and benzene. The quantity of the solvent is to be chosen such as to just dissolve the 1.4.5.6.7.7 - hexachloro-2.3-di-methlol-bicyclo(2.2.1)-5-heptene to be dehydrated when boiling. The dehydration is expediently accomplished in an apparatus in which the water azeotropically removed may be withdrawn from the reaction space and the solvent, after separation of the water, may be returned to the reaction space.

The processing of the reaction product is effected by concentrating the reaction solution and crystallizing the 4.5.6.7.10.10 - hexachloro-4.7 - endomethylene-4.7.8.9-tetrahydrophthalane.

The direct conversion of the hexachlorocyclopentadiene with cis-2-butene-1.4-diol without the use of a solvent must be effected with vigorous stirring of the heterogeneous reaction mixture at temperatures of 100–120° C. Thereby, the pure phthalane product slowly crystallizes from the reaction mixture in a coarse crystalline form. The reaction proceeds substantially slower than in the homogeneous phase and requires a reaction time of 3 to 5 days with the yield being 20–30% of the theoretically possible quantity.

The 4.5.6.7.10.10 - hexachloro - 4.7 - endomethylene-4.7.8.9-tetrahydrophthalane used as the starting material in accordance with the invention can also be produced from hexachlorocyclopentadiene and 2.5-dihydrofurane at temperatures of 80–150° C. This reaction is a Diels-Alder type synthesis proceeding according to the following equation:

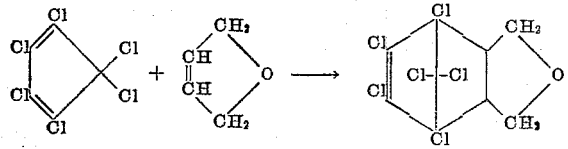

The conversion is accomplished by heating dihydrofurane with hexachlorocyclopentadiene alone or in the presence of a diluent. The diluents used must be non-reactive with the hexachlorocyclopentadiene and dihydrofurane. Examples of suitable diluents are benzene, toluene, dioxane, and saturated ethers.

The mol ratio of hexachlorocyclopentadiene to dihydrofurane is expediently chosen such as to have an excess of one of the reactants, preferably of dihydrofurane. The reaction may be effected by extended heating of the components with reflux of the excess dihydrofurane or at temperatures of 80–120° C. in a pressure tube. When operating in the presence of a diluent, equimolar quantities of the starting materials are to be used. In this case, the reaction is effected in a pressure tube at 90–150° C. The reaction time is 2 to 30 hours depending upon the reaction temperature used. The reaction may also be effected continuously by slowly passing a mixture of the two reactants together with a high boiling hydrocarbon as a diluting agent through, for example, heated tubes. When cooling the reaction solution, the addition product separates in a crystalline form.

The processing of the reaction mixture may be effected by drawing off the crystalline reaction product formed or by distilling off the unconverted reactants and the diluent which may be present. A discolorization of the raw product is easily removed by recrystallization from methanol or petroleum ether. A further purification is possible by sublimation under vacuum.

Instead of using pure hexachlorocyclopentadiene, the conversion with 2.5-dihydrofurane may be effected with the use of mixtures which, in addition to hexachlorocyclopentadiene, contain other materials, especially partially chlorinated cyclopentadienes.

When preparing hexachlorocyclopentadiene by the method reported by E. Straus and co-operators (see "Berichte der Deutschen Chemischen Gesellschaft," vol. 63, page 1884 (1930)) by the action of sodium hypochlorite solutions on cyclopentadiene, there are formed, in addition to hexachlorocyclopentadiene, chlorinated cyclopentadienes having less than 6 chlorine atoms in the molecule. The separation of the pure hexachlorocyclopentadiene by fractional distillation of the crude product causes considerable difficulties and entails great losses of hexachlorocyclopentadiene.

While, as stated by Straus, the conversion of cyclopentadiene with sodium hypochlorite solution results in a reaction product the yield of which, based on weight, corresponds to 82% of the theoretical quantity calculated on hexachlorocyclopentadiene, only 53.6% of pure hexachlorocyclopentadiene can be separated from this reaction product. This corresponds to a yield of only 44% of the theoretically possible quantity based on the cyclopentadiene charged. The remaining 46.4% of the reaction product could hitherto not be utilized for further conversions.

This modified working method allows the direct conversion of the hexachlorocyclopentadiene contained in the crude products with 2.5-dihydrofurane with the elimination of the uneconomical processing by distillation which involves much loss. It has very surprisingly been found that the hexachlorocyclopentadiene contained in the crude product reacts more rapidly with 2.5-dihydrofurane according to the Diels-Alder to form 4.5.6.7.10.10-hexachloro-4.7-methylene-4.7.8.9-tetrahydrophthalane than the low-chlorinated cyclopentadienes which are converted into chlorinated dicyclopentadienes. Thereby, a much better utilization of the hexachlorocyclopentadiene contained in the crude product is achieved than is possible by the separation of this compound by distillation.

The major part of the reaction product obtained by the conversion of the crude product with 2.5-dihydrofurane consists of 4.5.6.7.10.10 - hexachloro - 4.7 - methylene-4.7.8.9-tetrahydrophthalane. As side-products it contains a small amount of reaction products of dihydrofurane with the low-chlorinated cyclopentadienes and of reaction products of the low-chlorinated cyclopentadienes with each other.

For the conversion mentioned above there are suitable all reaction products which form by the action of alkali hypochlorite solutions on cyclopentadiene, i.e., the untreated reaction product as well as products which form by distillation of this crude product. The 2.5-dihydrofurane should be free from other unsaturated compounds, especially from 2.3-dihydrofurane. The conversion is effected by heating the chlorinated cyclopentadiene mixtures with 2.5-dihydrofurane per se or in the presence of a diluent. The diluents used must be non-reactive with hexachlorocyclopentadiene and dihydrofurane. Examples of suitable solvents are benzene, toluene, dioxane, and saturated ethers. The mol ratio of the starting products is expediently chosen so that an excess of dihydrofurane is present.

If the reaction is carried out in the absence of diluents, a molar ratio of 1 part of hexachlorocyclopentadiene mixture to 1.5–3 parts of 2.5-dihydrofurane is of particular advantage. The reaction may be accomplished by extended heating of the components with refluxing of the excess dihydrofurane or at temperatures of 80–150° C. in a pressure-resistant tube. In the presence of a diluent, equimolar amounts of the starting materials may be processed. The reaction time is 2–30 hours depending upon the reaction temperature used.

The processing of the reaction products is effected by distilling off the unconverted reactants and the diluent which may be present. The reaction products obtained in this manner are solid or semi-solid masses which are generally of dark color and which contain about 60–80% of 4.5.6.7.10.10-hexachloro-4.7-methylene-4.7.8.9-tetrahydrophthalane and can easily be purified by recrystallization. This purification, however, is not absolutely necessary, it being possible to chlorinate the unpurified reaction products.

The chlorination of the 4,5,6.7.10.10-hexachloro-4.7-endomethylene - 4.7.8.9. - tetrahydrophthalene, according to the invention, is used as the starting material may be effected by means of processes which effect a substitution in the tetrahydrofurane ring of the 4.5.6.7.10. 10 - hexachloro - 4.7-endomethylene-4.7.8.9-tetrahydrophthalane. This results in a chlorination product which, when having taken up two additional chlorine atoms, has an optimum of insecticidal properties.

The insecticides of the invention may be obtained by introducing gaseous chlorine into the solution of the 4.5.6. 7.10.10 - hexachloro - 4.7-endomethylene-4.7.8.9-tetrahydrophthalane in carbon tetrachloride or other chlorohydrocarbons suited for chlorinations in the liquid phase or other inert solvents. However, it is also possible to use solvents which, by taking up chlorine, are converted into chlorohydrocarbons, especially benzene, toluene, and others. Moreover, compounds from which the chlorine can easily be split off are also suitable chlorination agents.

The reaction may also be effected without the use of a solvent. In this case, the hexachlorophthalane is directly contacted with chlorine or the chlorinating agent. Room temperatures are generally sufficient for the conversion. It is of advantage, however, if the chlorination which proceeds as a chain reaction is stimulated and kept going by heat, light, or radical-forming substances. The chlorination may be effected in glass vessels or enamelled metal vessels in batchwise or continuous operation. Depending upon the working conditions and whether or not a solvent is used the absorption of chlorine is observed gravimetrically or by continuous sampling from the reaction vessel and determination of chlorine. The reaction can be considered as being terminated when the degree of chlorination desired is reached. This is in general a total of 8 gram atoms of Cl per mol of starting material, but products of 6.5 to 10 gram atoms of Cl per mol are also usable and effective.

When using a solvent, the separation of the active substance is effected by distillation or crystallization. This results in a white crystalline substance which can be processed into pesticide formulations without further purification. When maintaining a degree of chlorination of 8 gram atoms of chlorine per mol of starting material, maximum activity is reached on *Musca domestica*. In this case the chlorination product is a largely uniform substance which may be recrystallized from n-heptane and has then a melting point of 120–122° C. (corrected). This substance is obviously the endo-1.3.4.5.6.7.10.10-octachloro - 4.7-endomethylene-4.7.8.9-tetrahydrophthalane. In addition to this compound, however, especially if chlorination products having less or more than 8 gram atoms of chlorine in the molecule are involved, other chlorinated compounds are doubtless present in the reaction product.

The chlorination mixtures or also the pure endo-1,3.4. 5.6.7.10.10 - octachloro-4.7-endomethylene-4.7.8.9-tetrahydrophthalane obtained by means of the process of the invention can easily be used for the preparation of commercial formulations. Emulsions, suspensions, dusting and strewing agents, wettable dusts, sprays, fumigating agents or aerosols may be produced from them. For the emulsions there may be used emulsifiers such as higher molecular weight ethylene oxide condensation products, alkyl aryl sulfonates, fat alcohol sulfonates, etc. Suitable solvents are alcohols, ketones, aromatic, aliphatic and cyclic hydrocarbons, animal and vegetable oils and similar materials. Suitable carrier materials for the preparation of spray powders and dusts are talcum, kieselguhr, kaolin, bentonite or other pulverulent materials. In the further processing of the wettable dusts the addition of wetting agents, protective colloids and adhesives is required. Substances of this kind, however, may also be added to other types of formulations. For the preparation of aerosols the use of propellants and solvents such as halogenated methanes is required. The active material may also be processed to insecticide formulations in mixture with other insecticide toxicants which undergo no chemical reaction with the active material.

The following examples are given by way of illustration and not limitation:

EXAMPLE 1

A mixture of 80 gms. of hexachlorocyclopentadiene, 25 gms. of cis-2-butene-1.4-diol, and 75 cc. of dioxane was heated at 120° C. for three days in a thick-walled glass tube. After evaporation of the dioxane at 100° C. under a 20 mm. mercury vacuum the unconverted hexachlorocyclopentadiene and cis-2-butene-1.4-diol were distilled off under a 0.3 mm. mercury vacuum and a bath temperature of 130° C. The remaining distillation residue was dissolved hot in chloroform, the solution was decolorized with active carbon and, after filtration, cooled to −20° C. in a refrigerator. Thereby, 60 grams of 1.4.5.6.7.7 - hexachlor-2.3-dimethylol-bicyclo (2.2.1)-5-heptene crystallized as colorless flakes which had a melting point of 199° C. Evaporation of the motor liquor resulted in additional 16.5 gms. of the Diels-Alder adduct so that the total amount was 76.5 gms. corresponding to a yield of 75% of the theoretically possible quantity based on the cis-2-butene-1.4-diol charged.

Analysis: $C_9H_8O_2Cl_6$. Molecular weight: 360.89.

|    | Calculated, percent | Found, percent |
|----|---------------------|----------------|
| C  | 29.97               | 30.19          |
| H  | 2.21                | 2.15           |
| Cl | 58.95               | 59.10          |

Seventy-five grams of the 1.4.5.6.7.7-hexachlor-2.3-dimethylol-bicyclo(2.2.1)-5-heptene produced were heated with a solution of 350 cc. of toluene, 2 cc. of concentrated sulfuric acid, and 5 cc. of water in a dehydration apparatus with vigorous reflux. The apparatus consisted of a reaction flask in which the toluene solution of the product to be dehydrated was contained, and was equipped with a glass column with a reflux condenser mounted thereupon and a laterally attached water separator. The rising toluene vapors which azeotropically entrained the dehydration water were condensed in the cooler, dropped into the separator where a separation into a lower aqueous phase (dehydration water) and an upper toluene phase took place. The top toluene phase passed continuously back into the reaction flask. After three hours, 9 cc. of water had separated in the separator. The hot toluene solution was then decolorized with active carbon, evaporated, after filtration, under vacuum to one third of its volume, and cooled to −20° C. in a refrigerator. This resulted in 60.5 grams of 4.5.6.7.10.10-hexachlor-4.7-endomethylene-4.7.8.9-tetrahydrophthalane in a crystalline form. After recrystallization from alcohol this compound was obtained in colorless lamelliform crystals which had a melting point of 233° C.

Analysis: $C_9H_6OCl_6$. Molecular weight: 342.878.

|    | Calculated, percent | Found, percent |
|----|---------------------|----------------|
| C  | 31.52               | 31.61          |
| H  | 1.76                | 1.52           |
| O  | 4.67                | 4.80           |
| Cl | 62.05               | 62.55          |

EXAMPLE 2

A mixture of 80 gms. of hexachlorocyclopentadiene, 25 gms. of cis-2-butene-1.4-diol, and 75 cc. of dioxane was heated for three days while being refluxed. The reaction solution was then processed in the manner described in Example 1. The distillation residue was a colorless crystalline material and was dissolved in 250 cc. of toluene. The solution was mixed with 3 cc. of dilute sulfuric acid and dehydrated in the apparatus described in Example 1. After two hours, the reaction was completed. The reaction mixture was processed in the manner described in Example 1. This resulted in 40 grams of 4.5.6.7.10.10-hexachlor-4.7-endomethylene-4.7.8.9-tetrahydrophthalane.

EXAMPLE 3

A mixture of 80 grams of hexachlorocyclopentadiene, 25 grams of cis-2-butene-1.4-diol, and 75 cc. of dioxane was heated at 140° C. for 24 hours in the manner described in Example 1 and the reaction product was processed in the manner described in Example 1. After having distilled off all materials volatile at 130° C. and a 0.3 mm. mercury pressure there remained 80 grams of crude 1.4.5.6.7.7-hexachlor-2.3-dimethylol-bicyclo-(2.2.1)-5-heptene as a dark colored crystalline material. This crude product was heated for four hours with 400 cc. toluene and 5 cc. of 50 wt. percent sulfuric acid in the dehydration apparatus described in Example 1 with vigorous reflux. Decolorization of the hot toluene solution with active carbon, concentration of the filtered solution, and cooling to −20° C. resulted in 68 grams of 4.5.6.7.10.10-hexachlor-4.7-endomethylene-4.7.8.9-tetrahydrophthalane.

EXAMPLE 4

A mixture of 136 grams of hexachlorocyclopentadiene and 44 grams of cis-2-butene-1.4-diol was heated for three days with stirring in a two-necked flask with stirrer and reflux condenser on a water bath. During this time, 40 grams of 4.5.6.7.10.10-hexachlor-4.7-endomethylene-4.7.8.9-tetrahydrophthalane in a crystalline form had separated. After having drawn off the reaction solution and washed it with cold alcohol, this product could be obtained in a pure form having a melting point of 230° C.

EXAMPLE 5

A mixture of 27.3 grams of hexachlorocyclopentadiene and 10 grams of dihydrofurane was heated at 100° C. for 15 hours in a pressure-resistant vessel. The reaction product was mixed with 100 cc. of petroleum ether and cooled to −20° C. in a refrigerator. After having drawn off the precipitated crystal slurry, 25 grams of crude 4.5.6.7.10.10-hexachlor-4.7-endomethylene-4.7.8.9-tetrahydrophthalane were obtained which, by recrystallization from methanol, was recovered as colorless crystals having a melting point of 232° C.

Analysis: $C_9H_6OCl_6$. Molecular weight: 342.88.

|    | Calculated, percent | Found, percent |
|----|------|------|
| C  | 31.52 | 31.59 |
| H  | 1.76  | 1.41  |
| O  | 4.67  | 4.91  |
| Cl | 62.05 | 62.33 |

EXAMPLE 6

A mixture of 27.3 grams of hexachlorocyclopentadiene, 7 grams of dihydrofurane, and 50 cc. of benzene was heated at 120° C. for 16 hours in a pressure-resistant vessel. The reaction mixture was freed from benzene by evaporation under vacuum on a water bath and dissolved hot in much methanol. On cooling, 25 grams of 4.5.6.7.10.10-hexachlor-4.7-endomethylene-4.7.8.9-tetrahydrophthalane crystallized in the form of needles. The melting point of the product was 230° C.

EXAMPLE 7

A mixture of 27.3 grams of hexachlorocyclopentadiene and 20 grams of dihydrofurane was heated for 24 hours on a water bath. Then the excess dihydrofurane was distilled off and the residue was mixed with 50 cc. of petroleum ether. After having drawn off the mixture cooled to −10° C. the yellowish crystal slurry obtained was washed with much methanol. Thereby, 20 grams of 4.5.6.7.10.10-hexachlor-4.7-endomethylene-4.7.8.9-tetrahydrophthalane were obtained in the form of colorless crystals.

EXAMPLE 8

100 grams of 4.5.6.7.10.10-hexachlor-4.7-endomethylene-4.7.8.9-tetrahydrophthalane were dissolved in 300 cc. of carbon tetrachloride by heating. Chlorine at a rate of 25 liters/hr. was introduced into the solution at about 70° C. while irradiating with ultraviolet light. During the chlorination the solution was vigorously stirred. After ten minutes the reaction was terminated and the solution was evaporated under vacuum. The residue consisted of 110 grams of a white crystalline substance which had the composition $C_9H_{5.4}OCl_{6.6}$ as determined by elementary analysis.

EXAMPLE 9

100 grams of 4.5.6.7.10.10-hexachlor-4.7-endomethylene-4.7.8.9-tetrahydrophthalene were dissolved in 300 cc. of carbon tetrachloride in the manner described in Example 8 and chlorinated at 70° C. for 40 minute with 25 liters/hr. of chlorine. The crystalline product (120 grams) remaining after the chlorination and evaporation of the solvent had the empirical formula $C_9H_{3.9}OCl_{8.1}$. When recrystallized from n-heptane, there remained a substance which had a melting point of 120–122° C.

Analysis: $C_9H_4OCl_8$. Molecular weight: 411.78.

|    | Calculated, percent | Found, percent |
|----|------|------|
| C  | 26.25 | 26.33 |
| H  | 0.98  | 1.17  |
| O  | 3.89  | 3.68  |
| Cl | 68.88 | 69.18 |

EXAMPLE 10

100 grams of 4.5.6.7.10.10-hexachlor-4.7-endomethylene-4.7.8.9-tetrahydrophthalane were dissolved in 300 cc. of carbon tetrachloride in the manner set forth in Example 8 and treated for two hours with 25 liters/hr. of chlorine. After evaporation there remained 130 grams of a crystalline product having the empirical formula $C_9H_3OCl_9$.

EXAMPLE 11

100 grams of 4.5.6.7.10.10-hexachlor-4.7-endomethylene-4.7.8.9-tetrahydrophthalane were dissolved in 200 cc. of carbon tetrachloride and heated for 8 hours with 80 grams of sulfuryl chloride and 0.5 gram of benzoyl peroxide with a reflux condenser. After the termination of the reaction the reaction solution was evaporated to dryness under vacuum. There remained a yellowish-white residue of the composition $C_9H_{4.5}OCl_{7.5}$.

EXAMPLE 12

(a) 9 liters of a 2.09-normal sodium hypochlorite solution which still contained 0.2 mol of free sodium hydroxide was placed into a reagent bottle having a capacity of 10 liters and being capable of being cooled with flowing water. This solution, while vigorously stirring, was at once mixed with 110 gms. of freshly distilled cyclopentadiene. The stirring with a high-speed stirrer was continued for 15 minutes. During this time, the temperature increased to 40° C. After 30 minutes a heavy yellow, viscous liquid separated from the solution and was withdrawn.

The remaining reaction solution was again cooled to 15° C. and mixed with 110 grams of freshly distilled cyclopentadiene while stirring. The stirring was continued for 15 minutes. In this time an additional quantity of the heavy yellow reaction product formed. After 1 hour it was separated and combined with the first product. In this manner, a total of 728 grams of raw reaction product of a pungent smell and yellow-brown color was obtained from the total of 220 grams of cyclopentadiene charged. This reaction product was designated as Product R. Its refractive index was $n_D^{20}=1.5611$. It contained 25.79% of carbon, 0.68% of hydrogen and 73.36% of chlorine.

(b) 175 grams out of 200 grams of the product R obtained in this manner were distilled off at 20 mm. Hg in a simple distilling apparatus and this fraction was used as Product S for the conversion with 2.5-dihydrofurane. The refractive index of this mixture was $n_D^{20}=1.5585$.

(c) 160 grams out of 200 grams of the Product R were distilled off in the manner described under (b) above and the fraction obtained was used as Product T for the further conversion. This mixture had a refractive index of $n_D^{20}=1.5578$.

EXAMPLE 13

(a) 54.6 grams of the Product R described in Example 12(a) and 21 grams of 2.5-dihydrofurane were heated at 110° C. for 20 hours in a closed tube. The reaction mixture which was of dark color was then freed from unconverted dihydrofurane under a 20 mm. mercury vacuum on a water bath. The residue obtained was dissolved in 300 cc. of carbon tetrachloride. The solution was transferred into a three-necked flask equipped with a stirrer, a reflux condenser and a thermometer. While stirring and irradiating with a 500 watt mercury vapor lamp, a stream of chlorine of 21 liters/hr. was introduced into the solution which was heated to 70–80° C. After 30 minutes, the solvent was distilled off at a 20 mm. mercury pressure on a water bath. This resulted in 76.5 grams of a semi-solid Product Ia the analysis of which showed the following composition:

$C=31.26\%$
$H=1.78\%$
$O=4.23\%$
$Cl=62.61\%$ (b) A mixture of 54.6 grams of the Product R from Example 12(a) and 21 grams of 2.5-dihydrofurane was heated for 20 hours at 110° C. and worked up in the same manner as described in Example 13(a). The subsequent chlorination was effected for 90 minutes at the same flow rate of chlorine. After evaporation of the carbon tetrachloride, 85 grams of a semi-solid Product Ia were obtained. This product had the following composition:

$C=28.35\%$
$H=1.44\%$
$O=3.88\%$
$Cl=66.43\%$ (c) 54.6 grams of the Product R from Example 12(a) were reacted with 21.0 grams of 2.5-dihydrofurane and processed in the same manner as described in Example 13(a). The subsequent chlorination was effected for 3 hours at the same flow rate of chlorine. After evaporation of the carbon tetrachloride there remained 87.2 grams of a semi-solid Product Ic which had the following composition:

$C=27.61\%$
$H=1.45\%$
$O=3.54\%$
$Cl=67.83\%$

EXAMPLE 14

(a) A mixture of 54.6 gms. of the Product S described in Example 12(b) and 21 grams of 2.5-dihydrofurane were heated at 120° C. for 20 hours in a closed tube. Following this, the unconverted 2.5-dihydrofurane was distilled off under a 20 mm. mercury pressure from the reaction mixture obtained. The residue thereby obtained, in a carbon tetrachloride solution, was chlorinated for 30 minutes in the manner described in Example 13(a) using a flow rate of 21 liters/hr. of chlorine. The Product IIa obtained when evaporating the carbon tetrachloride comprised 78.5 grams and had the following composition:

$C=30.58\%$
$H=1.75\%$
$O=3.79\%$
$Cl=64.30\%$ (b) 54.6 grams of the Product S were reacted with 21 grams of 2.5-dihydrofurane in the manner described in Example 13(a) and the reaction product obtained was subsequently chlorinated for 45 minutes at the same flow rate of chlorine. After evaporation of the carbon tetrachloride there remained 83 grams of a semi-solid Product IIb which had the following composition:

$C=28.67\%$
$H=1.54\%$
$O=3.56\%$
$Cl=66.02\%$ (c) 54.6 grams of the Product B were reacted with 21 grams of 2.5-dihydrofurane in the manner described in Example 14(a) and the product obtained was chlorinated for 3 hours. The Product IIc obtained after evaporation of the solvent comprised 91.3 grams and had the following composition:

$C=26.35\%$
$H=1.21\%$
$O=3.27\%$
$Cl=69.12\%$

EXAMPLE 15

(a) 54.6 grams of the Product T described in Example 12(a) was reacted with 21 grams of 2.5-dihydrofurane in the manner described in the Examples 12 through 14. Following this, the reaction product separated was chlorinated for 60 minutes. After evaporation of the solvent there remained 83.8 grams of a Product IIIa which had the following composition:

$C=28.53\%$
$H=1.56\%$
$O=3.68\%$
$Cl=61.88\%$ (b) 54.6 grams of the Product T were reacted with 21 grams of 2.5-dihydrofurane in the manner described in Example 15(a) and the reaction product thereby obtained was chlorinated for 3 hours in the manner previously described. The Chlorination Product IIIb obtained after evaporation of the carbon tetrachloride comprised 88 grams and had the following composition:

$C=27.11\%$
$H=1.16\%$
$O=4.503\%$
$Cl=67.77\%$

The activity of the new insecticides was determined by means of a modified method described by W. M. Hoskins and P. S. Messenger (Agricultural Control Chemicals, Advances in Chemistry Series 1, 93–98 (1950)) by establishing the lethal dosage for 50% and 90%, respectively, of a breed ($LD_{50}$ values and $LD_{90}$ values, respectively) with *Musca domestica*. The test was carried out with the use of 4 days old females. As comparison, the $LD_{50}$ and $LD_{90}$ values of the pure active substance of some known insecticides are listed.

Table 1

| Substance | Relative toxicity after 24 hours to 4 days old females of *Musca domestica* | |
|---|---|---|
| | 50% mortality | 90% mortality |
| γ-1.2.3.4.5.6-hexachlorocyclohexane | 10 | 10 |
| p,p'-dichlordiphenyl-trichlorethane | 0.63 | 3.1 |
| 1.2.3.4.12.12-hexachlor-1.4.5.8-dimethylene-1.4.5.8.9.10-hexahydronaphthalene (Aldrine) | 10 | 10 |
| 1.2.3.4.12.12-hexachlor-6.7-epoxy-1.4.5.8-dimethylene-1.4.5.6.7.8.9.10-octahydronaphthalene (Dieldrine) | 8.6 | 10 |
| Chlordane | 1.5 | 0.2 |
| O,O-diethyl-thiophosphoric acid-O-p-nitrophenylester 70% (E 605 forte) | 150 | 800 |
| x.y.4.5.6.7.10.10-octachlor-4.7-methylene-1.2.4.7.-8.9-hexahydroindene | 10 | 10 |
| Chlorination product of Example 8 | 43 | 200 |
| Chlorination product of Example 9 | 300 | 670 |
| Chlorination product of Example 10 | 10 | 25 |
| Chlorination product of Example 11 | 60 | 80 |

It is interesting to note that the active substance according to the invention has a markedly good initial effect as may be seen from the following table in which the relative values for 50% upside down position after two hours are listed.

Table II

| Substance | Relative toxicity after 2 hours to 4 days old females of *Musca domestica*— 50% upside down position |
|---|---|
| γ-1.2.3.4.5.6.-hexachlorocyclohexane | 10 |
| p,p'-dichlordiphenyl-trichlorethane | 1.25 |
| 1.2.3.4.12.12 - hexachlor - 1.4.5.8 - dimethylene-1.4.5.-8.9.10-hexahydronaphthalene (Aldrine) | 0.36 |
| 1.2.3.4.12.12 - hexachlor - 6.7 - epoxy - 1.4.5.8 - dimethylene - 1.4.5.6.7.8.9.10-octahydronapthalene (Dieldrine) | 0.72 |
| Chlordane | 0.04 |
| O,O - diethyl - thiophosphoric acid - O - p - nitro-phenylester 70% (E 605 forte) | 78 |
| x.y.4.5.6.7.10.10 - octachlor - 4.7 - methylene -1.2.4.7.8.9-hexahydroindene | 0.21 |
| Chlorination product of Example 8 | 3.1 |
| Chlorination product of Example 9 | 20.8 |
| Chlorination product of Example 10 | 1.0 |
| Chlorination product of Example 11 | 6.3 |

It is already known that Diels-Alder addition compounds from hexachlorocyclopentadiene and unsaturated compounds, as such or after further chemical conversion, exhibit insecticidal properties and are suitable for combating noxious insects. The insecticides known under the trade names "Chlordane" and "Heptachlor," for example, are chlorination products of the addition compound from hexachlorocyclopentadiene and cyclopentadiene. The insecticide known under the trade name of "Aldrine" is an addition compound from hexachlorocyclopentadiene and bicycloheptadiene while "Dieldrine" is the trade name of the epoxy compound of Aldrine. Besides these generally known insecticides there are still other compounds derived from hexachlorocyclopentadiene in the manner set forth, which possess insecticidal properties which, however, are not as pronounced as those of the compounds previously mentioned.

The particular advantage of the use, in accordance with the invention, of 1.3.4.5.6.7.10.10-octachlor-4.7-endomethylene-4.7.8.9-tetrahydrophthalane as an insecticide resides in the surprisingly high insecticidal activity which is by many times better than that of all compounds of this type hitherto known. The activity of the new compound is also substantially higher than that of the known insecticides made up of chlorine-containing hydrocarbons such as γ-hexachlorocyclohexane (Lindane) or p-dichlordiphenyl-trichlorethane (DDT). In some cases the new compounds are even of somewhat higher activity than known phosphorous insecticides such as p-nitrophenyl-diethyl-thiophosphate (E 605, Parathion). By its extremely high insecticidal activity, 1.3.4.5.6.7.10.10-octachlor-4.7-endomethylene-4.7.8.9-tetrahydrophthalane fundamentally differs from the known chlorine-containing hydrocarbon insecticides. To reach a given effect, the quantities required of the compound of the invention are substantially lower than those required of the known chlorine-containing insecticides so that it is possible to work with extremely low concentrations.

The same high activity of the compound of the invention was also found on noxious insects other than *Musca domestica* by means of laboratory tests and field tests. Tests have been carried out on a number of insects from the group of the sucking insects, which are difficult to combat and the test results have been listed in Table III. The comparative agent used was in all cases E 605 (f) which had a content of 47.7% of pure active material (p-nitrophenyl-diethyl-thiophosphate). When applied in a concentration of 0.035% and a quantity of 600 liters/hektar (=243 liters/acre) there results a dosis applied of 100 grams/hektar (40 grams/acre) of pure active material.

The compound of the invention, in contrast to this, was used in a quantity which corresponded to a dosis applied of only 24 grams of pure active material per acre (60 gms./hektar).

Table III

SUCKING INSECTS

A: Compound of the invention (24 gms./acre)
B: E 605 (f) (40 grams/acre)
L: Laboratory tests
F: Field tests

| Insect Pest | Insecticides | Percent of insects fallen to ground | Percent kill for insects fallen to ground | Percent kill at the plant | Time in days | Type of Test |
|---|---|---|---|---|---|---|
| Doralis pomi [1] | A | 5 | 100 | 100 | 1 | L |
|  | A | 75 | 100 | 100 | 1 | L |
|  | B | 75 | 100 | 100 | 1 | L |
| Doralis Young Animals | A | 75 | 90 | 100 | 1 | L |
|  | B | 50 | 90 | 100 | 1 | L |
| Pomaphis [1] | A | --- | --- | 100 | 2 | F |
|  | B | --- | --- | 100 | 2 | F |
| Doralis fabae [1] | A | 95 | 98 | 100 | 1 | L |
|  | B | 95 | 98 | 100 | 1 | L |
| Wooly apple aphid (*Eriosoma lanigerum*) | A | --- | --- | 100 | 2 | F |
|  | B | --- | --- | 100 | 2 | F |

[1] German designations of *Doralis pomi*=Grüme Apfelblattlaus, *Pomaphis*=mehlige Pflaumenlaus, *Doralis fabae*=schwarze Bohenblattlaus.

The wide effective range of the compound of the invention may be seen from Table IV. In this case, the effect of the new agent on the potato bug was investigated as an example of biting insects. The comparative preparation used was a mixture of Lindane and DDT which is known under the trade name of "Aktiv-Gesapon (Neu)" (Active Gesapone New).

Table IV

A = Compound of the invention (dilution 1:10,000)
B = Mixture of Lindane and DDT (tradename "Aktiv-Gesapon Neu") (dilution 1:3,000–4,000)
Figures without parentheses: percent kill
Parentheses figures: percent of insects severely damaged.

| Insect Pest | Agent | 1st day | 3rd day | 5th day | Kind of Laboratory test |
|---|---|---|---|---|---|
| Potato bug (*Leptinotarsa decemlineata*) young bugs. | A | 5 (95) | 60 (40) | 90 (10) | Applied to food. |
|  | B | 0 (85) | 10 (90) | 55 (45) | |
| Do | A | 5 (95) | 40 (60) | 100 (0) | Applied to bugs. |
|  | B | 0 (90) | 5 (95) | 30 (70) | |
| Potato bugs L4 (larvae). | A | 0 (95) | 65 (35) | 95 (5) | Applied to food. |
|  | B | 0 (90) | 40 (60) | 65 (35) | |
| Potato bugs L3–L4 | A | 25 (75) | 75 (25) | 95 (5) | Applied to bugs. |
|  | B | 0 (100) | 55 (45) | 70 (30) | |

The insecticidal activity of the chlorination products prepared according to Examples 13 through 15 may be seen from the following Table V. This table indicates that the insecticidal activity of the chlorination products of the invention increases as the chlorine content increases until a maximum is reached, and decreases with higher chlorine contents. To reach maximum activity the insecticidal activity of the reaction products is constantly observed during the chlorination by sampling in order to allow timely discontinuation of the reaction.

Table V

| Chlorination products according to Examples 13–15 | Chlorine content, percent | Chlorine atoms per molecule | Relative after 24 hours LD₅₀ | Toxicity after 2 hours 50% upside-down position |
|---|---|---|---|---|
| γ-hexachloro-cyclohexane | --- | --- | 40 | 40 |
| Ia | 62.61 | 6.1 | 80 | 5 |
| Ib | 66.43 | 7.2 | 300 | 50 |
| Ic | 67.83 | 7.6 | 170 | 25 |
| IIa | 64.33 | 6.6 | 48 | 9 |
| IIb | 66.02 | 7 | 400 | 25 |
| IIc | 69.12 | 8.1 | 150 | 25 |
| IIIa | 65.88 | 7 | 120 | 20 |
| IIIb | 67.77 | 7.6 | 240 | 14 |

While the initial toxicity of the chlorination products of the invention ranges only little below that of γ-hexachlorocyclohexane, their long lasting activity is by ten times higher than that of γ-hexachloro-cyclohexane.

The products of the invention may also be used in mixture with other insecticides, such as with γ-hexachlorocyclohexane, 1.2.3.4.12.12 - hexachlor - 1.4.5.8 - dimethylene-1.4.5.8.9.10-hexahydronaphthalene, 1.2.3.4.12.12-hexachlor-6.7-epoxy-1.4.5.8-dimethylene - 1.4.5.6.7.8.9.10-octahydronaphthalene.

We claim:

1. As a new chemical compound, a chlorinated product of 4.5.6.7.10.10-hexachloro-4.7-endomethylene-4.7.8.9-tetrahydrophthalane containing an average of 6.5 to 10 chlorine atoms per molecule.

2. As a new chemical compound, 1.3.4.5.6.7.10.10-octachloro-4.7-endomethylene-4.7.8.9-tetrahydrophthalane.

3. Process for the production of 4.5.6.7.10.10-hexachloro-4.7-endomethylene - 4.7.8.9 - tetrahydrophthalane, which comprises heating a mixture of cis-2-butene-1.4-diol and hexachlorocyclopentadiene at a temperature between about 100 and 150° C., thereafter separating the water from the reaction product formed in an azeotropic distillation with toluene and small amounts of sulfuric acid dehydrating the 1.4.5.6.7.7-hexachloro-2.3-dimethylbicyclo (2.2.1)-5-heptene formed by said heating, and recovering from the reaction mixture the 4.5.6.7.10.10-hexachloro-4.7-endomethylene-4.7.8.9 - tetrahydrophthalane formed.

4. Process according to claim 3, in which said heating is effected with reactants dissolved in an inert solvent.

5. Process according to claim 3, in which said heating is effected at a temperature between about 100 and 120° C. with a heterogeneous mixture of the reactants and in which said separation of water is substantially simultaneously effected at said temperature.

6. Process according to claim 3, in which the 4.5.6.7.10.10-hexachloro-4.7-endomethylene-4.7.8.9 - tetrahydrophthalane formed is chlorinated with the addition of an average of 0.5-4-chlorine atoms per molecule and the insecticidally active chlorination product produced recovered.

7. Process according to claim 6, in which said chlorination is effected with the addition of about 2 chlorine atoms per molecule.

8. Process for the production of 4.5.6.7.10.10-hexachloro-4.7 - endomethylene - 4.7.8.9 - tetrahydrophthalane which comprises heating a mixture of dihydrofurane and hexachlorocyclopentadiene at a temperature between about 80 and 150° C., and recovering from the reaction mixture the reaction product formed.

9. Process according to claim 8, in which said heating is effected in the presence of a molar excess of one of the reactants.

10. Process according to claim 8, in which said heating is effected in the presence of an inert diluent.

11. Process according to claim 8, in which said hexachlorocyclopentadiene is present in a chlorinated reaction mixture obtained from the reaction of cyclopentadiene and an alkali hypochlorite solution.

12. Process according to claim 8, in which said recovered reaction product is chlorinated with the addition of an average of about 0.5-4 atoms chlorine per molecule and the insecticidally active product formed recovered.

13. Process according to claim 12, in which said chlorination is effected with the addition of about 2 chlorine atoms per molecule.

14. The compound of the structural formula

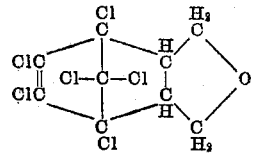

No references cited.